United States Patent [19]

Bussey, Jr.

[11] 4,379,106
[45] Apr. 5, 1983

[54] METHOD OF EXPANDING HEAT EXPANDABLE THERMOPLASTIC ELEMENTS WITH STEAM AND A HORIZONTAL EXPANDER WITH A FEED NEAR THE BOTTOM FOR EXPANDING THE HEAT EXPANDABLE ELEMENT

[76] Inventor: Harry Bussey, Jr., P.O. Box 115, Serpentine Rd., Navesink, N.J. 07752

[21] Appl. No.: 223,697

[22] Filed: Jan. 9, 1981

[51] Int. Cl.³ .................... B29D 27/00; F27B 9/18
[52] U.S. Cl. ................... 264/51; 198/661; 198/664; 264/37; 264/DIG. 9; 406/56; 432/13; 432/58; 432/118
[58] Field of Search ............ 264/51, 53, 37, DIG. 9; 406/56; 198/661, 662, 657, 663, 664, 665, 666, 667, 676; 432/13, 58, 118

[56] References Cited

U.S. PATENT DOCUMENTS

| | | | |
|---|---|---|---|
| 241,278 | 5/1881 | Barnard | 198/665 |
| 513,018 | 1/1894 | Keeler | 198/664 |
| 1,071,371 | 8/1913 | Tyson | 198/664 |
| 1,423,698 | 7/1922 | Thurston | 198/661 X |
| 1,767,248 | 6/1930 | Leach | 198/661 X |
| 1,867,573 | 7/1932 | Leach | 198/661 X |
| 2,944,292 | 7/1960 | Norrhede | 264/DIG. 9 |
| 3,023,175 | 2/1962 | Rodman | 264/DIG. 9 |
| 3,056,487 | 10/1962 | Kipper | 198/661 |
| 3,139,272 | 6/1964 | Couchman | 264/DIG. 9 |
| 3,207,820 | 9/1965 | Scarvelis et al. | 264/DIG. 9 |
| 3,227,424 | 1/1966 | Cunningham | 264/DIG. 9 |
| 3,804,378 | 4/1974 | Walls et al. | 264/DIG. 9 |
| 3,832,430 | 8/1974 | Noziere | 264/DIG. 9 |
| 3,876,741 | 4/1975 | Klein | 264/DIG. 9 |
| 4,272,469 | 6/1981 | Smith | 264/DIG. 9 |
| 4,274,818 | 6/1981 | Montgomery et al. | 264/DIG. 9 |

*Primary Examiner*—Philip E. Anderson
*Attorney, Agent, or Firm*—Kenyon & Kenyon

[57] ABSTRACT

The steam expander conveys the expanding heat expandable thermoplastic elements along a horizontal axis using a plurality of paddle frames. The paddle frames serve to agitate and tumble the elements during movement from an inlet to an outlet. At the same time, steam is injected into the housing of the expander to expand the elements. The expanded elements can be drawn off via a vacuum line to an overhead hopper or hoppers.

32 Claims, 5 Drawing Figures

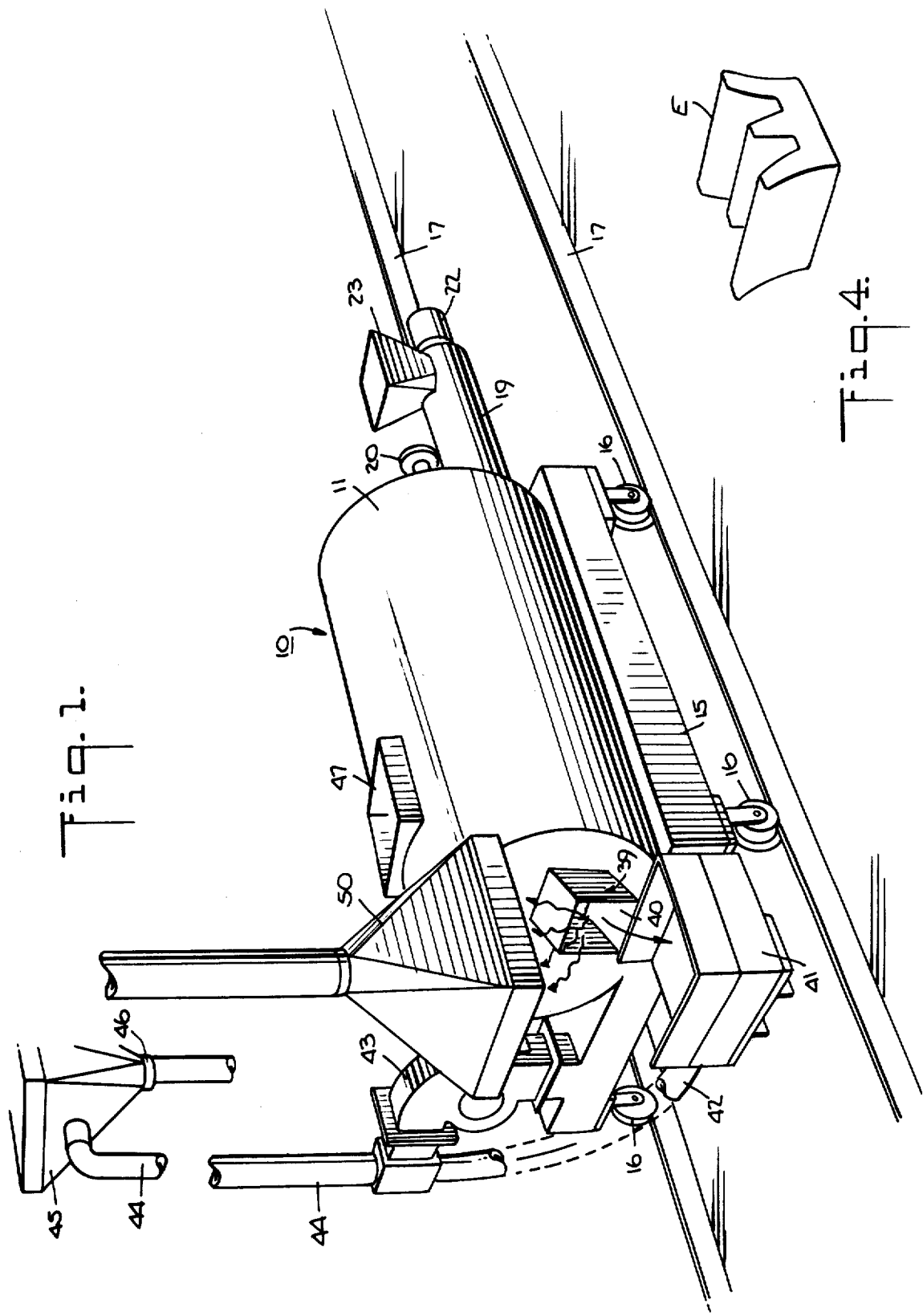

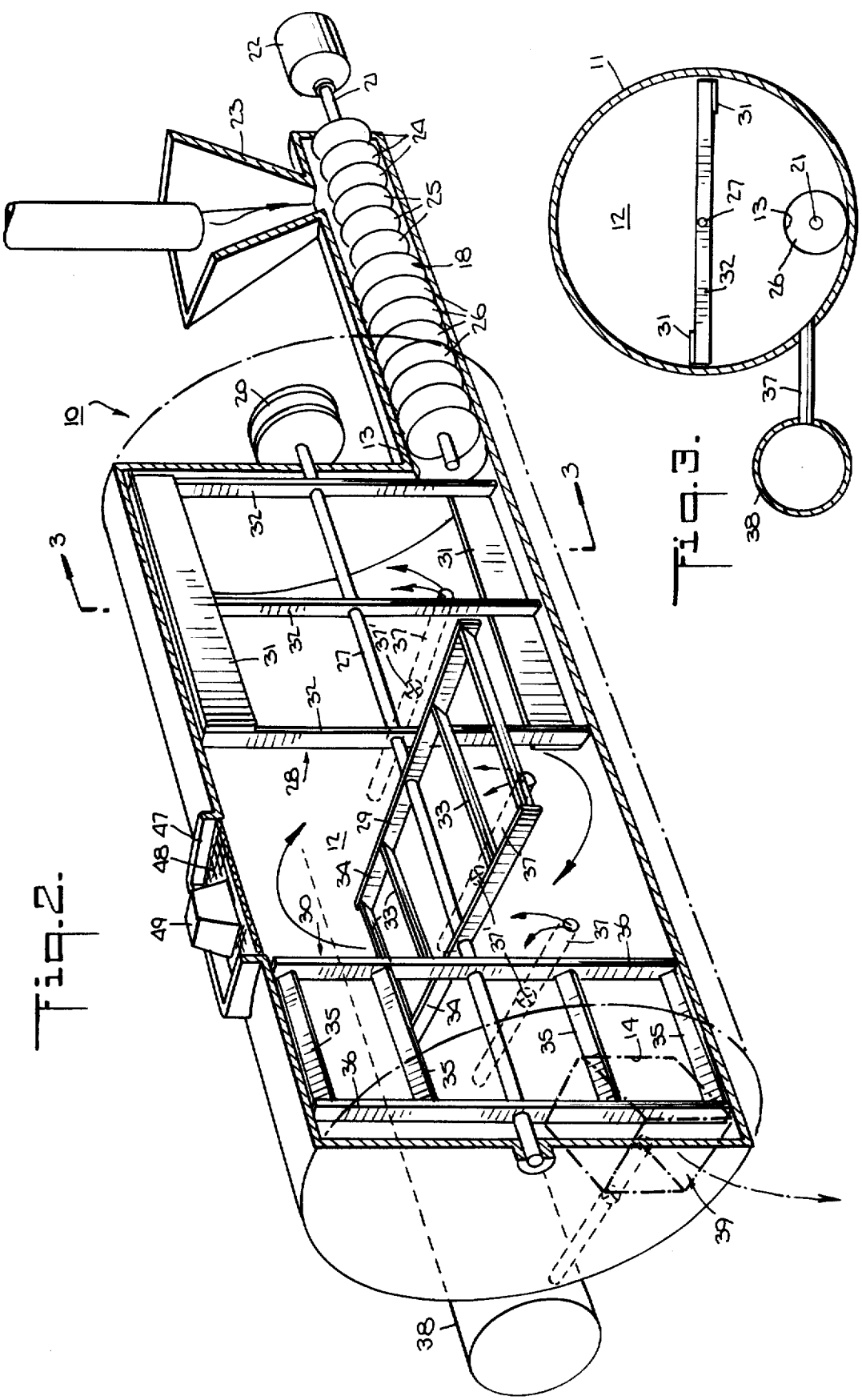

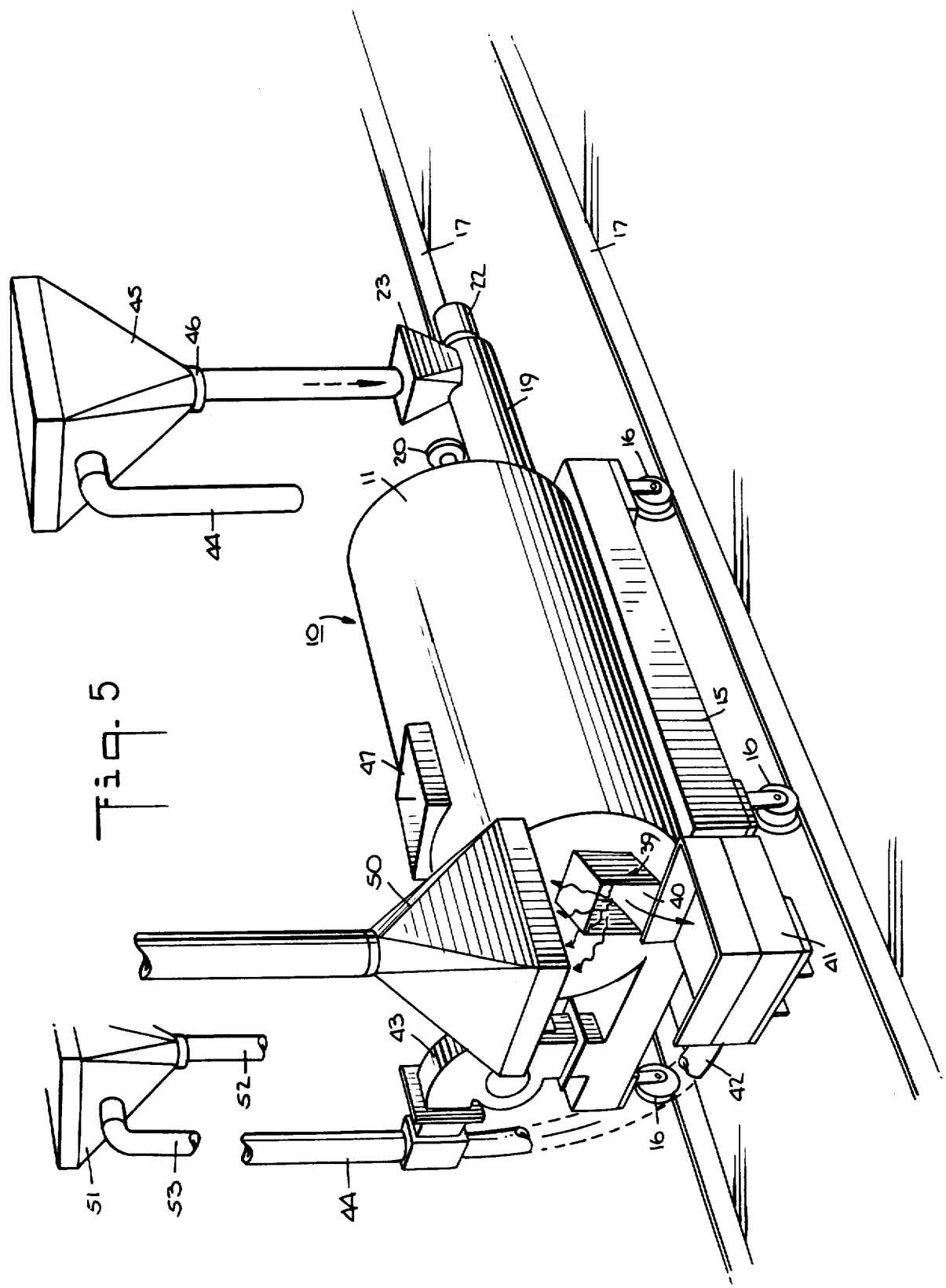

METHOD OF EXPANDING HEAT EXPANDABLE THERMOPLASTIC ELEMENTS WITH STEAM AND A HORIZONTAL EXPANDER WITH A FEED NEAR THE BOTTOM FOR EXPANDING THE HEAT EXPANDABLE ELEMENT

This invention relates to an expander for expanding expandable thermoplastic elements and a method of expanding heat expandable thermoplastic elements. More particularly, this invention relates to a steam expander for expanding loose fill heat expandable thermoplastic elements.

As is known, various types of heat expandable thermoplastic elements have been used for packaging materials. Generally, these packaging materials are intended to provide a cushion to protect an item being transported in a shipping container against impacts and vibrations. In many cases, these elements are manufactured in a latent forming or heat expandable state by extrusion processes and packaged for shipment to various local distributors in this state. The distributor thereafter heats various quantities of the elements in order to expand the elements into a foamed or heat expanded state which are then shipped to a user, for example in bags of from 3 to 7 cubic feet.

One reason for carrying out the above procedures is to be able to ship large quantities of the latent foaming elements in a relatively compact manner from a manufacturer to a distributor. In addition, this permits the distributor to keep an inventory of elements within a relatively small storage area until ready for expansion and shipment to a user.

However, the techniques which have been used for expanding the expandable elements have certain disadvantages. For example, it has been known to feed a charge of expandable elements into a hopper from below and to inject an upward flow of steam into the material from the base of the hopper. As the steam flow rises, the expanding elements float or carry to the top of the hopper and thereafter spill out over the top of the hopper in expanded form. However, in many cases, a number of the elements become broken during travel through the hopper and, thus, are not suitable for packing purposes. In addition, if some elements are heated excessively, the gas within the elements which causes the expansion escapes. This, in turn, causes the elements to "deflate" and become heavier. Thus, a heavy zone of such deflated elements may form at approximately mid-height of the hopper creating a risk of blockage.

It has also been known to convey the expandable elements on a perforated vacuum belt into a covered steam chamber wherein the steam is directed through the elements and belt in order to expand the elements. However, such devices are relatively long and the elements are subjected to an uneven expansion. Further, these devices require an excessive amount of heat due to the large surface areas which must be heated.

Accordingly, it is an object of the invention to provide a technique for expanding heat expandable thermoplastic elements in a relatively simple efficient manner.

It is another object of the invention to conserve the energy required for expanding heat expandable thermoplastic elements.

It is another object of the invention to provide a uniform expansion of a mass of heat expandable thermoplastic elements.

It is another object of the invention to avoid damaging the individual elements of a mass of heat expandable thermoplastic elements during expansion.

Briefly, the invention provides an expander which is comprised of a housing having an inlet for receiving a flow of heat expandable thermoplastic elements and an outlet for expelling a flow of thermoplastic elements in expanded form, means for passing a heated medium into the housing for heating and expanding the elements therein and means rotatably mounted on a horizontal axis within the housing for agitating and conveying the thermoplastic elements from the inlet to the outlet.

The housing is constructed to define a cylindrical chamber with the inlet at one end and the outlet at the opposite end.

The means for passing the heated medium, for example, steam, includes a plurality of pipes which are connected in communication with a lower part of the cylindrical chamber and a manifold for passing steam through each pipe into the chamber.

The rotatably mounted means includes a shaft which extends along the axis of the cylindrical housing and a paddle frame mounted on the shaft adjacent the inlet for pushing the received elements towards the outlet. This paddle frame includes a plurality of radially disposed paddles which are disposed in spaced radial relation to the shaft to pass through the projected plane of the inlet for clearing a cavity therebehind for a fresh inflow of the expandable elements. In addition, at least one other paddle frame is mounted on the shaft to tumble the elements within the chamber. This latter paddle frame includes a plurality of paddles disposed in spaced radial relation to the shaft to pass through a mass of the expandable elements. Also, each paddle is disposed at an angle relative to a plane radial to the shaft to facilitate movement through the mass of elements.

The expander may also be provided with a means, such as a feed screw, at the inlet end for feeding a fresh inflow of expandable elements into and through the inlet. In addition, the expander may be provided with a basket adjacent and below the outlet for receiving the expanded elements as well as a means for withdrawing the elements from the basket, for example, a vacuum line which is connected to the basket to withdraw the elements from the basket. This vacuum line may be connected to a hopper located above the expander for receiving the withdrawn elements.

A suitable hood can be provided over the outlet of the expander in order to draw off steam flowing from the cylindrical chamber of the housing. A vent may also be provided in an upper part of the housing adjacent the outlet end to draw off excess steam. This vent may be provided with a screen for supporting a tray which can be used to dry a charge of expanded elements, for example for weighing the elements to determine the dry weight of the elements leaving the expander.

The invention further provides a method of expanding heat expandable elements which is comprised of steps of feeding a supply of the elements into a horizontally disposed chamber from one axial end at a rate to maintain the chamber in a substantially filled condition, agitating the elements in the chamber while conveying the elements towards an outlet at an opposite end and passing a heated medium into the chamber for heating and expanding the elements during conveyance toward the outlet. Because the chamber is substantially filled at all times, the heated medium, for example, steam, is effectively used to heat the elements per se with a minimum of air being heated.

In accordance with the method, the expanded elements may be withdrawn from the outlet of the chamber and recycled into and through the inlet for a second stage heating in the chamber. In this case, the withdrawn expanded elements may be stored, for example in a hopper as noted above, prior to re-cycling.

The withdrawing and re-cycling steps may be performed in a repetitive manner to effect a third stage heating of the elements in the chamber. In this case, a second hopper may be provided for storing the expanded elements between the second and third stage.

The expander may be movably mounted, for example on a set of rails, for movement along a predetermined path. In this case, a plurality of hoppers can be disposed in a row over and along the path of the expander with each hopper having an outlet for dumping thermoplastic elements therefrom. At least some of these outlets may be selectively connectable to the inlet of the expander to deliver elements thereto for expansion, for example for a second stage or a third stage heating. In addition, each hopper may be selectively connectable to the expander via a vacuum line, for example to the basket, in order to withdraw the elements expelled from the outlet into the hopper. In use, the expander is positioned on the rails at a point downstream of the row of hoppers. A supply of heat expandable thermoplastic elements is then fed into the expander, expanded and passed out of the outlet into the basket. The elements are then drawn up into the first hopper via the vacuum line. After a charge of elements has been placed in the hopper, the expander is shut down and moved to the second hopper. At this time, the outlet of the first hopper is connected to the feeding means of the expander while the vacuum line to the basket at the outlet end is connected to the second hopper. The partially expanded elements are then recycled through the expander for a second stage expansion. These steps are again repeated for the third hopper.

The expanded elements which have undergone a three stage expansion can then be stored for subsequent use. For example, the elements can be packaged into bags and shipped to the ultimate consumer, for use in cushioning items within shipping containers.

These and other objects and advantages of the invention will become more apparent from the following detailed description taken in conjunction with the accompanying drawings wherein:

FIG. 1 illustrates a perspective view of a system employing a heat expander in accordance with the invention;

FIG. 2 illustrates a cut-away view of the steam expander of FIG. 1;

FIG. 3 illustrates a view taken on line 3—3 of FIG. 2;

FIG. 4 illustrates a perspective view of an expanded thermoplastic element processed in a steam expander in accordance with the invention; and FIG. 5 illustrates a view similar to FIG. 1 with the expander between two hoppers in accordance with the invention.

Referring to FIG. 1, the steam expander 10 includes a housing 11 which defines a horizontal cylindrical chamber 12 (see FIG. 2) with an inlet 13 at one axial end and an outlet 14 at the opposite axial end of the chamber 12. As indicated in FIG. 2, the inlet 13 is of circular shape and is located near the bottom dead center of the housing 11. The housing 11 is mounted on a suitable frame 15 which, in turn, has a plurality of wheels 16 to permit transport of the expander 10 from place to place. For example, the wheels 16 may be flanged and mounted on a set of rails 17 for movement along a predetermined path for purposes as explained below.

Referring to FIG. 2, the expander 10 has a means at the inlet 13 for feeding expandable elements into and through the inlet 13. For example, the feed means is in the form of a feed screw 18 which is rotatably mounted within a cylindrical tube 19 secured to the housing 11 coaxially of the inlet 13. The feed screw 18 has a shaft 21 which is driven at one end via a suitable motor 22 so as to rotate within the tube 19. In addition, a funnel 23 is disposed on the upper side of the tube 19 to deliver the thermoplastic elements into the tube 19 for movement along the feed screw 18 during rotation thereof.

The feed screw 18 has flights of varying dimension mounted on the shaft 21 for feeding of the elements. For example, where the tube 19 has an inside diameter of 6 inches, the initial flights 24 below the funnel 23 have an outside diameter of, for example, 3 inches whereas the intermediate flights immediately downstream have an outside diameter of 4 inches while the remaining flights 26 have an outside diameter of 6 inches. The clearance between the flights 24, 25 and the tube 19 serve to prevent breaking of the elements during travel along the screw 18.

Referring to FIG. 2, the expander 10 also has a rotatable means within the chamber 12 for agitating and conveying the elements within the chamber 12 from the inlet 13 to the outlet 14. This means includes a rotatable shaft 27 which extends through the inlet end of the housing 11 and is driven via a pulley wheel 20 from a suitable source (not shown). In addition, a plurality of paddle frames 28, 29, 30 are mounted on the shaft 27 adjacent tne inlet 13 for pushing the received elements toward the outlet 14. This paddle frame 28 includes a plurality of radially disposed paddles 31 which are mounted on the shaft 27 via suitable legs 32. The paddles 31 are disposed in spaced radial relation to the shaft 27 in order to pass through the plane of the inlet 13 for clearing a cavity therebehind for a fresh inflow of the expandable elements through the inlet 13. As indicated in FIG. 3, each paddle 31 is of a radial width, as viewed, slightly less than the diameter of the inlet 13. As each paddle 31 moves past the inlet 13, for example clockwise as viewed in FIG. 3, a mass of elements in front of the paddle 31 is pushed upwardly from the plane of the inlet 13 while the space behind the paddle 31 remains vacant. This permits an inflow of fresh elements into the housing 11 without compacting against previously fed elements.

As shown in FIG. 2, the second paddle frame 29 is mounted on the shaft 27 adjacent to the paddle frame 28. The paddle frame 29 has a plurality of paddles 33 connected to the shaft 27 via legs 34 in a ladder-like manner. As shown, the paddles 33 are disposed in spaced radial relation to the shaft 27 and to each other in order to pass through a mass of the expandable elements in the chamber 12. Further, each paddle 33 is disposed at an angle of from example 45°, relative to the plane radial to the shaft 27 to facilitate passage through the elements and tumbling of the elements. In this respect, the elements are tumbled and agitated so that a heating medium can be passed through the mass of elements.

The paddles 35 on the frame 30 are inclined at a different angle from the paddles 33 in order to slightly retard the outflow of the elements through the outlet 14. In this manner, a speed differential can be used to insure a substantially complete filling of the chamber 11 by the thermoplastic elements during operation.

Referring to FIGS. 2 and 3, the expander has a means for passing a vaporous heated medium, such as steam, into the housing 11 for heating and expanding the thermoplastic elements therein. As indicated, this means includes a plurality of pipes 37 which are connected in communication with a lower part of the chamber 11 and a manifold 38 for passing a flow of steam through each pipe 37 into the chamber 12. For example, four such pipes 37 are disposed longitudinally of the housing 11 for injecting steam along the length of the shaft 27. In addition, each of these pipes 37 has an adjustable control valve 37' therein to control the flow of steam and, thus, the heat into the expander 10.

The outlet 14 of the housing 11 of the expander 10 is provided with a spout-like extension 39 having a downwardly sloping bottom wall 40 so as to direct the outflowing elements in a downward direction. The extension 39 is adjustably mounted on the housing 11 so as to be movable vertically. This allows the amount of elements flowing from the expander 10 to be varied, i.e. by raising or lowering of the extension 39 relative to the outlet 13. In addition, a basket 41 (see FIG. 1) is disposed below the spout-like extension 39 for receiving the expanded elements.

The expander 10 is also provided with a suitable means for withdrawing the expanded elements from the basket 41. As indicated in FIG. 1, this means includes a vacuum line 42 which is connected to the basket 41 for withdrawing the expanded elements from the basket and a vacuum pump 43 for generating a suitable suction force for removing the elements. This vacuum line 42 is further connected to a vacuum line 44 leading to a hopper 45 in which the expanded elements can be stored. As shown in FIG. 1, the hopper 45 is located above the expander 10. This hopper 45 is made of a porous material, such as a net like fabric and has an outlet 46 at a lower end for subsequent dumping of the expanded elements. Since the elements undergo substantial expansion within the expander 10, the hopper 45 is of a substantially greater volume than the expander 10.

Referring to FIG. 2, the expander housing 11 is also provided with a vent 47 in an upper part adjacent to the outlet end to allow excess steam to pass out of the chamber 12. In addition, the vent 47 has a screen 48 extended across the opening provided by the vent 47 and a tray or cup 49 is removably mounted on top of the screen 48. The screen 48 and tray 49 permit a sample of the processed elements to be dried within the tray 49 by using the waste heat from the chamber 12. The weight of the elements being processed can then be determined. For example, the tray may have a unit volume so that filling of the tray with elements and weighing provides a rapid read-out of the weight per unit volume.

As shown in FIG. 1, a hood 50 is also located over and above the spout-like extension 39 of the outlet 14 so as to draw off excess steam. This hood 50 may be connected to any suitable outlet source or chimney.

In order to expand heat expandable thermoplastic elements, for example elements made as described in U.S. Pat. No. 4,166,875, a continuous charge of the elements is fed into the funnel 23 of the feed means and conveyed by the feed screw 18 into and through the inlet 13. During this time, the paddle frames are rotating so that the first frame 28 moves the elements in a clockwise upward direction as viewed in FIG. 3 while conveying the elements toward the outlet 14. At the same time, steam is injected into the bottom of the chamber 12 via the pipes 37 with the control valve 37' in the pipe 37 closest to the feed end moved into a throttling position so that the steam injected into the first section of the expander 10, i.e. within the sweep of the first paddle frame 28, is maintained at a lower pressure than in the remaining sections. This allows the elements in the first section to be gentle heated in an initial expansion. The injected steam is also directed against the direction of flow of the elements. Thus, the steam is broken up and then rises within the expander 10 to heat and expand the elements.

The structure of the housing 11 is such that with the inlet 13 near the bottom dead center of the housing 11 and the steam pipes 37 to the side, the steam rises above the inlet 13 and is thus retained within the housing at the inlet end and, thus, does not escape through the inlet 13.

The steam can be superheated e.g. at a temperature of 380° F. and a pressure, e.g. of 60 psi, for delivery via the pipes 37. Upon passage into the expander, the pressure is caused to drop, e.g. to 3 psi while the temperature drops to 215° F. In this way, the heat remains substantially within the expander 10.

It is to be noted that the rate of infeed of the elements into the housing 11 is such as to maintain a substantially completely filled chamber 12.

After passing from the influence of the paddle frame 28, the elements pass under the influence of the paddle frame 29. During this time, the elements continue to expand under the inflow of steam and continue to be tumbled and agitated by the paddles 33 of the paddle frame 29. Thereafter, the expanding elements pass under the influences of the paddle frame 30. At this time, due to the inclination of the paddles 35, the elements begin to decelerate before passing out of the inlet 14. This deceleration of the elements further insures that the chamber 12 is completely filled with the elements.

Upon exiting from the outlet 14, the expanded elements drop into the basket 41 and are withdrawn via the vacuum line 42 into the hopper 45. The elements E, for example as shown in FIG. 4, can then be subsequently used for various purposes.

As indicated in FIG. 5, the expander 10 is mounted on rails 17. This permits the expander 10 to be used with a plurality of hoppers which are located above and along the path of the rails 17. For example, after processing an initial charge of expandable elements in the expander 10 and storing the expanded elements in the hopper 45, the vacuum line 44 to the hopper 45 is disconnected from the vacuum line 42 to the basket 41 and the expander 10 is moved along the rails 17 to a point between the initial hopper 45 and a second hopper 51. Thereafter, the vacuum line 42 is connected to a vacuum line 53 to the hopper 51 while the outlet 46 of the initial hopper 45 is placed in communication with the funnel 23 of the feed means. In this way, the expanded elements can be recycled through the expander 10 and delivered into the second hopper 51. As above, the hopper 51 has an outlet 52 for dumping of the expanded elements.

By adding a third hopper (not shown) along the rails 17, the elements can be further expanded in a third stage.

The above system can be utilized so as to carry out various stages of heating. In this way, the expansion of the elements from one stage to the next can be more particularly controlled.

The invention thus provides a steam expander which can be substantially filled with heat expandable thermoplastic elements and heated with a minimum of steam. In this regard, since the chamber 12 of the housing 11 is substantially filled, for example more than 75% full, the steam passing through the chamber 12 is able to heat the elements rather than a waste volume of air.

The expansion provided by the expander is substantially uniform. For example, starting with an expandable material having a bulk density of 30 pounds per cubic foot, a material can be expanded to a bulk density of about 0.3 to 0.4 pounds per cubic foot.

The relative dimensions of the steam expander can be such as to accomodate various volumes of expandable elements and flow rates of the expanding elements through the housing.

By changing various parameters, the density of the expanded elements can be changed.

For example, by changing the residence time of the elements in the expander the density can be changed. To this end, by increasing the speed of the feed screw 18, the residence time of the elements in the expander 10 is decreased and, thus, the density is increased. By decreasing the feed screw speed, the residence time is increased and the density decreased. Alternatively, by raising the spout-like extension 39, the output of the elements is decreased, thus, increasing the residence time and decreasing the density. By lowering the extension 39, the residence time is decreased and the density is increased.

By changing the heat delivered to the expander 10, the density of the elements can be changed, i.e. by increasing the heat, the density is decreased.

By way of example, the following parameters in a first stage expansion of a three-stage cycle gives the indicated densities:

EXAMPLE 1

| Screw Speed | 10RPM |
|---|---|
| Steam | 3 psi |
| Chute | 75% Full |
| Density | 0.9 lbs. per cubic ft. bulk density |

EXAMPLE 2

| Screw Speed | 8RPM |
|---|---|
| Steam | 3 psi |
| Chute | 75% Full |
| Density | 0.87 lbs. per cubic ft. bulk density |

EXAMPLE 3

| Screw Speed | 10RPM |
|---|---|
| Steam | 6 psi |
| Chute | 75% Full |
| Density | 0.86 lbs. per cubic ft. bulk density |

EXAMPLE 4

| Screw speed | 15RPM |
|---|---|
| Steam | 3 psi |
| Chute | 75% Full |
| Density | 9.2 lbs. per cubic ft. bulk density |

Since the expander 10 is disposed on a horizontal axis along which the expanding elements are conveyed, any elements which deflate would be continuously conveyed along with the expanding elements to the outlet 14 and expelled. Further, because of the gentle action provided by the paddles, there is little risk that the expanding elements will be broken or otherwise damaged during expansion. In this respect, the speed of the paddles is adjusted to the flow speed of the expanding elements so as to provide a gentle tumbling or agitating effect.

Various modifications can be made in the construction of the expander 10 for various purposes. For example, a safety hopper (not shown) can be used at the inlet end for feeding of the elements to be expanded to the feed screw 18. Such a safety hopper may be constructed to define a tortuous path for the elements while precluding passage of a person's arm.

What is claimed is:

1. A method of expanding heat expandable thermoplastic elements, said method comprising the steps of
   feeding a supply of heat expandable thermoplastic elements into a horizontally disposed chamber near the bottom dead center of the chamber at one axial end thereof to maintain the chamber in a substantially filled condition;
   agitating the elements in the chamber while conveying the elements towards an outlet at an opposite end of the chamber; and
   passing a heated medium upwardly into the chamber for heating and expanding the elements therein during conveyance toward the outlet.

2. A method as set forth in claim 1 which further comprises the steps of
   withdrawing the expanded elements from the outlet of the chamber and re-cycling the expanded elements into and through the inlet for a second stage heating in the chamber.

3. A method as set forth in claim 2 which further comprises the step of storing the withdrawn expanded elements prior to re-cycling.

4. A method as set forth in claim 3 wherein said withdrawing and re-cycling steps are performed in repetitive manner to effect a third stage heating of the elements in the chamber.

5. A method as set forth in claim 1 wherein the heated medium is steam and wherein the steam is passed upwardly into a first section adjacent said one end at a lower pressure than in the remaining sections to gently heat the elements in an initial expansion.

6. An expander comprising
   a housing having an inlet at one end near the bottom dead center of said housing for receiving a flow of heat expandable thermoplastic elements and an outlet at an opposite end for expelling a flow of thermoplastic elements in expanded form;
   means for passing a vaporous heated medium into a lower part of said housing for heating and expanding the thermoplastic elements therein while being retained within said housing at said one end; and means rotatably mounted on a horizontal axis within said housing for continuously agitating and conveying the thermoplastic elements from said inlet to said outlet along said horizontal axis.

7. An expander as set forth in claim 1 wherein said housing defines a cylindrical chamber.

8. An expander as set forth in claim 6 which further comprises a basket adjacent said housing and below said outlet for receiving expanded elements, a vacuum line connected to said basket for withdrawing the elements from said basket and a porous hopper connected to said vacuum line to receive the withdrawn elements.

9. An expander as set forth in claim 6 which further comprises a feed screw for feeding expandable thermoplastic elements into and through said inlet and a funnel for feeding the elements to said feed screw.

10. An expander as set forth in claim 9 wherein said feed screw has flights of varying dimension, said flights below said funnel being of less diameter than said flights spaced from under said funnel.

11. An expander as set forth in claim 6 which further comprises a spout like extension at said outlet for directing outflowing elements in a downward direction, said extension being adjustably mounted on said housing relative to said outlet to vary the amount of outflow from said outlet.

12. A steam expander for expanding loose fill heat expandable thermoplastic elements, said expander comprising a housing defining a horizontal cylindrical chamber including an inlet at one end of said chamber near the bottom dead center of said chamber and an outlet at an opposite end of said chamber;

rotatable means within said chamber for agitating and conveying thermoplastic elements within said chamber from said inlet to said outlet; and means for passing steam upwardly into said chamber to heat and expand the thermoplastic elements passing from said inlet to said outlet while being retained within said housing at said one end.

13. A steam expander as set forth in claim 12 wherein said rotatable means includes a rotatable shaft extending longitudinally of said chamber and a first paddle frame mounted on said shaft adjacent said inlet for pushing the received elements towards said outlet, said paddle frame having a plurality of radially disposed paddles thereon, each said paddle being disposed in spaced radial relation to said shaft to pass through the plane of said inlet for clearing a cavity therebehind for a fresh inflow of the expandable elements through said inlet.

14. A steam expander as set forth in claim 13 wherein said rotatable means further includes at least one other paddle frame mounted on said shaft to tumble the elements within said chamber; said other paddle frame having a plurality of paddles disposed in spaced radial relation to said shaft to pass through a mass of the expandable elements in said chamber, each paddle of said other paddle frame being disposed at an angle relative to a plane radial to said shaft.

15. A steam expander as set forth in claim 12 wherein said rotatable means includes at least one paddle frame mounted on said shaft to tumble the elements within said chamber, said paddle frame having a plurality of paddles disposed in spaced radial relation to said shaft to pass through a mass of the expandable elements in said chamber, each paddle of said paddle frame being disposed at an angle relative to a plane radial to said shaft.

16. A steam expander as set forth in claim 12 which further comprises means at said inlet for feeding a fresh inflow of expandable elements into and through said inlet.

17. A steam expander as set forth in claim 16 wherein said latter means is a feed screw.

18. A steam expander as set forth in claim 12 which further comprises a basket adjacent and below said outlet for receiving expanded elements therefrom and means for withdrawing elements from said basket.

19. A steam expander as set forth in claim 12 wherein said housing has a vent in an upper part adjacent said outlet end and a screen over said vent to support a tray thereon for drying of a charge of expanded elements therein.

20. A steam expander as set forth in claim 12 wherein said rotatable means includes a rotatable shaft extending longitudinally of said chamber, a first paddle frame mounted on said shaft adjacent said inlet for pushing the received elements towards said outlet, said paddle frame having a plurality of radially disposed paddles thereon, each said paddle being disposed in spaced radial relation to said shaft to pass through the plane of said inlet for clearing a cavity therebehind for a fresh inflow of the expandable elements through said inlet;

a second paddle frame mounted on said shaft to tumble the elements within said chamber, said second paddle frame having a plurality of paddles disposed in spaced radial relation to said shaft to pass through a mass of the expandable elements in said chamber, each paddle of said second paddle frame being disposed at an angle relative to a plane radial to said shaft; and a third paddle frame mounted on said shaft to tumble the elements within said chamber, said third paddle frame having a plurality of paddles disposed in spaced radial relation to said shaft to pass through a mass of the expandable elements in said chamber, each paddle of said third paddle frame being disposed at an angle less than said angle of said paddles of said second paddle frame relative to a plane radial to said shaft.

21. A system for expanding expandable thermoplastic elements comprising a movably mounted expander having an inlet near a bottom thereof for receiving a flow of heat expandable thermoplastic elements, an outlet at an opposite end for expelling a flow of thermoplastic elements in expanded form, and means for heating and expanding the elements between said inlet and said outlet, said expander being movable along a predetermined path;

a plurality of hoppers disposed over and along said path, each said hopper having an outlet for dumping thermoplastic elements therefrom, at least some of said hopper outlets being selectively connectable to said inlet of said expander to deliver elements thereto for expansion; and a plurality of vacuum lines, each said vacuum line being in communication with a respective hopper and being selectively connectable to said expander to withdraw elements expelled from said expander outlet into said respective hopper.

22. A system as set forth in claim 21 which further comprises a pair of rails and wherein said expander has wheels riding on said rails.

23. A system as set forth in claim 21 wherein said expander has a basket under said outlet for receiving expanded elements, said basket being selectively connectable to a respective one of said vacuum lines.

24. An expander comprising a housing defining a cylindrical chamber disposed on a horizontal axis and including an inlet near the bottom dead center of said chamber for receiving a flow of heat expandable thermoplastic elements and an outlet at an opposite end of said chamber for expelling a flow of thermoplastic elements in expanded form;

means rotatably mounted on a horizontal axis within said housing for agitating and conveying the thermoplastic elements from said inlet to said outlet along said horizontal axis; and means for passing a vaporous heated medium into said housing longitudinally along a lower part of said chamber and against the direction of flow of the elements for heating and expanding the thermoplastic elements therein while being retained within said housing at the inlet end.

25. An expander as set forth in claim 24 which further comprises a hood located above said outlet for drawing off excess heating medium from said chamber.

26. An expander comprising a housing having an inlet for receiving a flow of heat expandable thermoplastic elements and an outlet for expelling a flow of thermoplastic elements in expanded form;

means for passing a heated medium into said housing for agitating and conveying the thermoplastic elements from said inlet to said outlet along said horizontal axis, said rotatably mounted means including a shaft extending along said axis, a first paddle frame mounted on said shaft adjacent said inlet for pushing the received elements towards said outlet, a second paddle frame mounted on said shaft adjacent said first paddle frame to tumble the elements within said chamber and a third paddle frame mounted on said shaft adjacent said outlet to tumble and retard the outflow of the elements through said outlet.

27. An expander comprising a housing having an inlet at one end near the bottom of said housing for receiving a flow of heat expandable thermoplastic elements and an outlet at an opposite end for expelling a flow of thermoplastic elements in expanded form;

means for passing a vaporous heated medium into a lower part of said housing for heating and expanding the thermoplastic elements therein while being retained within said housing at said one end; and means rotatably mounted on a horizontal axis within said housing for continuously agitating and conveying the thermoplastic elements from said inlet to said outlet along said horizontal axis, said rotatably mounted means including a shaft extending along said axis, a first paddle frame mounted on said shaft adjacent said inlet for pushing the received elements towards said outlet, a second paddle frame mounted on said shaft adjacent said first paddle frame to tumble the elements within said chamber and a third paddle frame mounted on said shaft adjacent said outlet to tumble and retard the outflow of the elements through said outlet.

28. An expander as set forth in claim 27 wherein said first paddle frame has a plurality of radially disposed paddles thereon, each said paddle being disposed in spaced radial relation to said shaft to pass through the plane of said inlet for clearing a cavity therebehind for a fresh inflow of the expandable elements through said inlet.

29. An expander as set forth in claim 28 wherein each of said second and third paddle frames has a plurality of paddles disposed in spaced radial relation to said shaft to pass through a mass of the expandable elements in said chamber, each paddle of said second paddle frame being disposed at an angle of 45° relative to a plane radial to said shaft and each paddle of said third paddle frame being disposed at an angle of 30° relative to a plane radial to said shaft.

30. An expander as set forth in claim 27 wherein said means for passing a heated media into said housing includes a plurality of pipes connected in communication with a lower part of said chamber longitudinally of said axis and a manifold for passing steam through each pipe into said chamber.

31. An expander as set forth in claim 30 wherein at least said pipe closest said inlet has an adjustable valve therein for throttling the flow of heated medium into said chamber.

32. An expander as set forth in claim 30 wherein said housing has a vent in an upper part adjacent said outlet end and a hood on said housing over said outlet for drawing off the heated medium exiting through said outlet.

* * * * *